US009650020B1

(12) United States Patent
Bindas et al.

(10) Patent No.: US 9,650,020 B1
(45) Date of Patent: May 16, 2017

(54) DETAIL BAY WASH WATER RECLAIM SYSTEM

(71) Applicant: Chace Ruttenberg & Freedman, LLP, Providence, RI (US)

(72) Inventors: Randolph Bindas, South Walpole, MA (US); Christopher J. Joyal, Attleboro, MA (US); Neil J. Dick, Charlotte, NC (US)

(73) Assignee: RAPIDTECH, LLC, Attleboro, MA (US)

(*) Notice: Subject to any disclaimer, the term of this patent is extended or adjusted under 35 U.S.C. 154(b) by 837 days.

(21) Appl. No.: 13/690,214

(22) Filed: Nov. 30, 2012

Related U.S. Application Data

(60) Provisional application No. 61/565,219, filed on Nov. 30, 2011.

(51) Int. Cl.
B60S 3/04 (2006.01)
(52) U.S. Cl.
CPC .................................... B60S 3/04 (2013.01)
(58) Field of Classification Search
None
See application file for complete search history.

(56) References Cited

U.S. PATENT DOCUMENTS

| 2,139,096 | A | * | 12/1938 | Piquerez | B60S 3/00 134/104.4 |
| 2,419,397 | A | * | 4/1947 | Frohoff | B60S 3/04 119/669 |
| 2,862,222 | A | * | 12/1958 | Cockrell | B60S 3/04 134/111 |
| 2,922,173 | A | * | 1/1960 | Lind | B60S 3/00 134/109 |
| 2,928,268 | A | * | 3/1960 | Hetzer | D06F 43/081 210/129 |
| 3,259,138 | A | * | 7/1966 | Heinicke | B60S 3/04 118/314 |
| 3,421,526 | A | * | 1/1969 | Wiley | B60S 3/04 134/109 |
| 3,425,427 | A | * | 2/1969 | Andersen | B60S 3/042 134/32 |
| 3,502,215 | A | * | 3/1970 | Cahan | C02F 9/00 134/109 |

(Continued)

Primary Examiner — Robert James Popovics
(74) Attorney, Agent, or Firm — Chace Ruttenberg & Freedman LLP

(57) ABSTRACT

A wash water reclaim system comprising a platform, the platform comprising a left peripheral edge and a right peripheral edge; a separation chamber, the separation chamber approximately located at the center of the platform; a recycled water storage chamber, the recycled water storage chamber located at either the left peripheral edge or the right peripheral edge of the platform; at least one pipe, the at least one pipe connecting the separation chamber to the recycled water storage chamber; at least one loading deck; the at least one loading deck located between the separation chamber and the recycled water storage chamber, the at least one loading deck angled downward toward the separation chamber; and at least one grating, the at least one grating covering at least a portion of the separation chamber and/or at least a portion of the recycled water storage chamber.

10 Claims, 7 Drawing Sheets

(56) References Cited

U.S. PATENT DOCUMENTS

| | | | | |
|---|---|---|---|---|
| 3,550,778 A * | 12/1970 | Kesselman | C02F 9/00 | 210/167.3 |
| 3,774,625 A * | 11/1973 | Wiltrout | C02F 9/00 | 134/104.2 |
| 3,911,938 A * | 10/1975 | Wiltrout | B08B 3/00 | 134/104.1 |
| 4,029,114 A * | 6/1977 | Wiltrout | C02F 1/28 | 134/104.1 |
| 4,104,164 A * | 8/1978 | Chelton | B01D 37/00 | 210/136 |
| 4,135,533 A * | 1/1979 | Gall | B60S 3/00 | 134/104.4 |
| 4,168,231 A * | 9/1979 | Allen | B01D 21/00 | 210/136 |
| 4,168,232 A * | 9/1979 | Allen | B01D 21/00 | 15/DIG. 2 |
| 4,246,982 A * | 1/1981 | Pretnick | F16N 31/004 | 180/69.1 |
| 4,543,182 A * | 9/1985 | Gramse | B01D 17/0208 | 134/111 |
| 4,652,368 A * | 3/1987 | Ennis | B01D 36/02 | 134/109 |
| 4,818,388 A * | 4/1989 | Morioka | B05B 15/1266 | 210/167.31 |
| 4,852,593 A * | 8/1989 | Daugherty | B60S 3/042 | 134/123 |
| 4,917,125 A * | 4/1990 | Midkiff | B60S 3/042 | 134/123 |
| 4,955,405 A * | 9/1990 | Glick | B60S 3/04 | 134/123 |
| 4,979,536 A * | 12/1990 | Midkiff | B60S 3/042 | 134/123 |
| 5,033,489 A * | 7/1991 | Ferre | B60S 3/002 | 134/107 |
| 5,093,012 A * | 3/1992 | Bundy | B01D 37/00 | 137/12 |
| D329,996 S * | 10/1992 | Ciszewski | D12/604 | |
| 5,160,430 A * | 11/1992 | Gasser | B01D 61/12 | 134/109 |
| 5,223,150 A * | 6/1993 | Bundy | B01D 37/00 | 137/12 |
| 5,261,433 A * | 11/1993 | Smith | B60S 3/042 | 134/123 |
| 5,341,828 A * | 8/1994 | Ferguson, Sr. | B08B 3/022 | 134/123 |
| 5,374,352 A * | 12/1994 | Pattee | B08B 3/14 | 134/110 |
| 5,413,128 A * | 5/1995 | Butts | B60S 3/04 | 134/111 |
| 5,458,299 A * | 10/1995 | Collins | B64F 5/0054 | 134/123 |
| 5,458,778 A * | 10/1995 | Stuckmann | C02F 1/24 | 210/603 |
| 5,462,655 A * | 10/1995 | Ladd | B01D 61/04 | 134/104.2 |
| 5,498,329 A * | 3/1996 | Lamminen | B01D 17/00 | 134/123 |
| 5,547,312 A * | 8/1996 | Schmitz, Jr. | F16N 31/006 | 134/104.2 |
| 5,556,535 A * | 9/1996 | Van Der Est | B01D 37/00 | 138/40 |
| 5,597,001 A * | 1/1997 | Rasmussen | B08B 3/00 | 134/104.2 |
| 5,665,245 A * | 9/1997 | Kloss | B01D 17/00 | 134/111 |
| 5,707,514 A * | 1/1998 | Yamasaki | B01J 47/10 | 210/151 |
| 5,785,067 A * | 7/1998 | Kosofsky | B08B 3/006 | 134/102.1 |
| RE35,871 E * | 8/1998 | Bundy | C02F 1/283 | 137/12 |
| 5,797,994 A * | 8/1998 | Rasmussen | B08B 3/00 | 134/10 |
| 5,816,743 A * | 10/1998 | Schmitz, Jr. | F16N 31/006 | 137/312 |
| 5,848,856 A * | 12/1998 | Bohnhoff | E02B 11/00 | 405/36 |
| 5,853,494 A * | 12/1998 | Andersson | B60S 3/04 | 134/10 |
| 6,000,631 A * | 12/1999 | Lamminen | B60S 3/04 | 134/123 |
| 6,021,792 A * | 2/2000 | Petter | B08B 3/026 | 134/104.2 |
| 6,042,730 A * | 3/2000 | Lahti | C02F 1/42 | 210/667 |
| 6,106,712 A * | 8/2000 | New | B01D 17/0208 | 141/98 |
| 6,120,614 A * | 9/2000 | Damron | B08B 3/006 | 134/10 |
| 6,164,298 A * | 12/2000 | Petter | B08B 3/026 | 134/104.4 |
| 6,358,330 B1 * | 3/2002 | McGraw | B60S 3/042 | 134/104.4 |
| 6,402,855 B1 * | 6/2002 | Damron | B08B 3/006 | 134/10 |
| 6,461,509 B1 * | 10/2002 | Verwater | C02F 3/06 | 210/150 |
| 6,558,769 B1 * | 5/2003 | Chwala | B32B 3/266 | 180/69.1 |
| 6,561,201 B1 * | 5/2003 | Midkiff | B60S 3/042 | 134/104.4 |
| 6,655,396 B2 * | 12/2003 | Krenzel | B08B 3/026 | 134/104.1 |
| 6,715,517 B2 * | 4/2004 | Tobin | B08B 17/025 | 141/311 A |
| 6,799,591 B2 * | 10/2004 | McCormick | B08B 17/00 | 134/104.2 |
| 6,895,978 B2 * | 5/2005 | Midkiff | B60S 3/042 | 134/104.1 |
| 7,111,631 B1 * | 9/2006 | Breeze | B60S 1/66 | 134/123 |
| 7,118,633 B2 * | 10/2006 | Jenkins | B08B 17/00 | 134/10 |
| 7,121,288 B2 * | 10/2006 | Jenkins | B08B 17/00 | 134/104.2 |
| 7,203,979 B2 * | 4/2007 | O'Brien | A47K 3/286 | 239/279 |
| 7,258,749 B2 * | 8/2007 | McCormick | B08B 17/00 | 134/10 |
| 7,278,435 B2 * | 10/2007 | Roles, Jr. | B60S 3/00 | 134/104.2 |
| D555,303 S * | 11/2007 | Taylor | D32/4 | |
| 7,530,362 B2 * | 5/2009 | McCormick | B08B 17/00 | 134/104.1 |
| 7,540,295 B2 * | 6/2009 | McCormick | B08B 17/00 | 134/104.1 |
| 7,775,221 B2 * | 8/2010 | Zeile | B08B 17/00 | 134/123 |
| 7,943,040 B2 * | 5/2011 | Taylor | C02F 1/008 | 204/660 |
| 7,987,862 B2 | 8/2011 | McCormick et al. | | |
| 8,097,155 B2 * | 1/2012 | Ennis | B01D 29/05 | 210/232 |
| 8,267,100 B2 * | 9/2012 | McCormick | B08B 17/00 | 134/104.2 |
| 8,272,390 B2 * | 9/2012 | McCormick | B08B 17/00 | 134/104.2 |
| 8,480,888 B2 * | 7/2013 | Ashley | C02F 1/463 | 210/122 |
| 8,506,720 B2 * | 8/2013 | Petter | B08B 17/00 | 134/10 |
| 8,597,434 B2 * | 12/2013 | Barrios | B08B 3/026 | 134/115 R |
| 8,701,687 B2 * | 4/2014 | MacKinnon | B08B 3/14 | 134/123 |
| 8,721,805 B2 * | 5/2014 | Barrios | B08B 3/026 | 134/105 |

(56) References Cited

U.S. PATENT DOCUMENTS

| | | | | |
|---|---|---|---|---|
| 8,864,910 B2* | 10/2014 | Petter | ................... | B08B 17/00 134/10 |
| 2002/0117191 A1* | 8/2002 | Krenzel | ................. | B08B 3/026 134/104.1 |
| 2004/0231703 A1* | 11/2004 | McCormick | ............ | B08B 17/00 134/10 |
| 2005/0184011 A1* | 8/2005 | Fields | ..................... | C02F 9/00 210/748.12 |
| 2008/0000507 A1* | 1/2008 | Snyder | ................... | B08B 17/00 134/123 |
| 2009/0266387 A1* | 10/2009 | Mccormick | ............ | B08B 17/00 134/123 |
| 2012/0048311 A1* | 3/2012 | Turner | ................... | B60S 3/04 134/109 |
| 2012/0140079 A1* | 6/2012 | Millar | ................ | G06K 9/00577 348/148 |
| 2012/0145192 A1* | 6/2012 | MacKinnon | ............. | B08B 3/14 134/10 |
| 2013/0113937 A1* | 5/2013 | Millar | ................ | G06K 9/00577 348/148 |

* cited by examiner

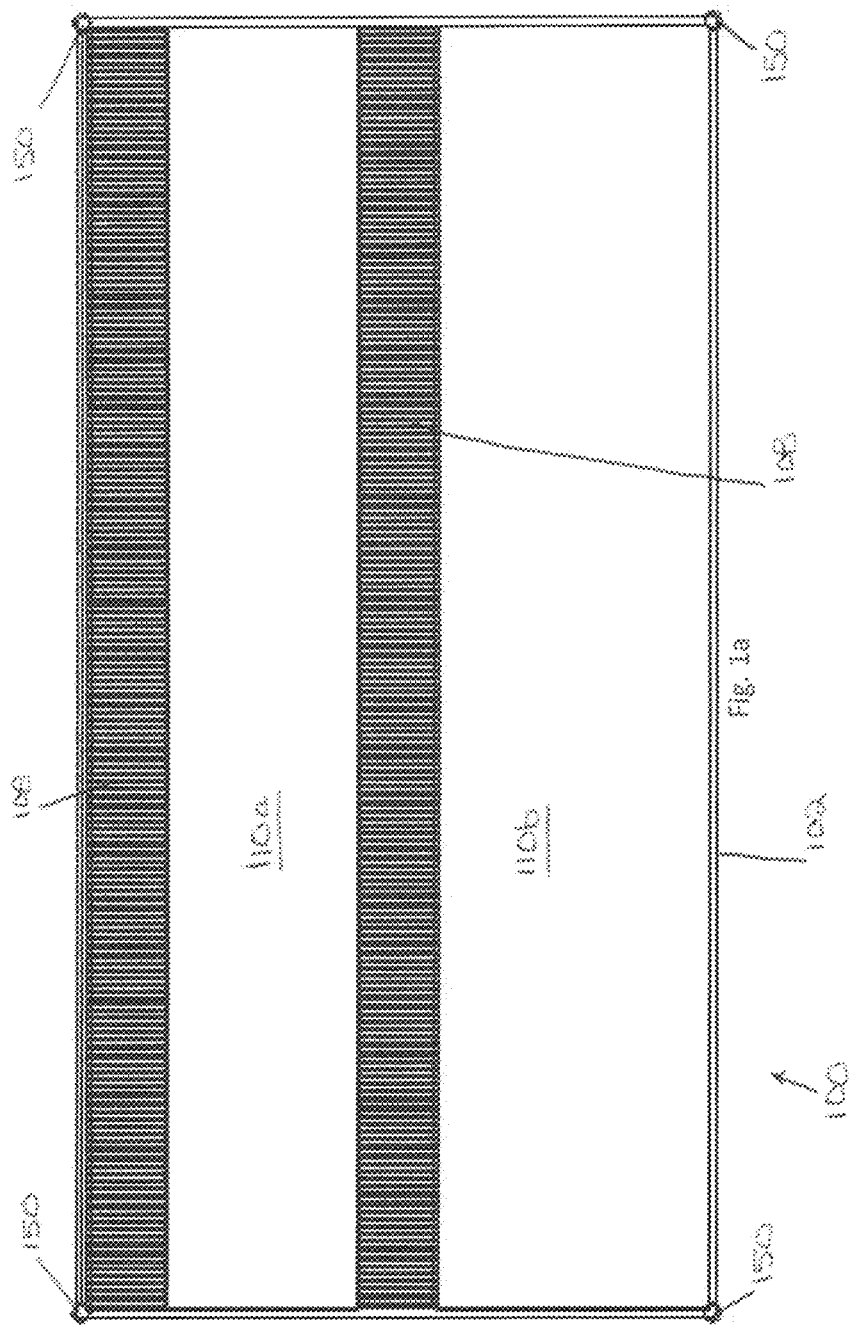

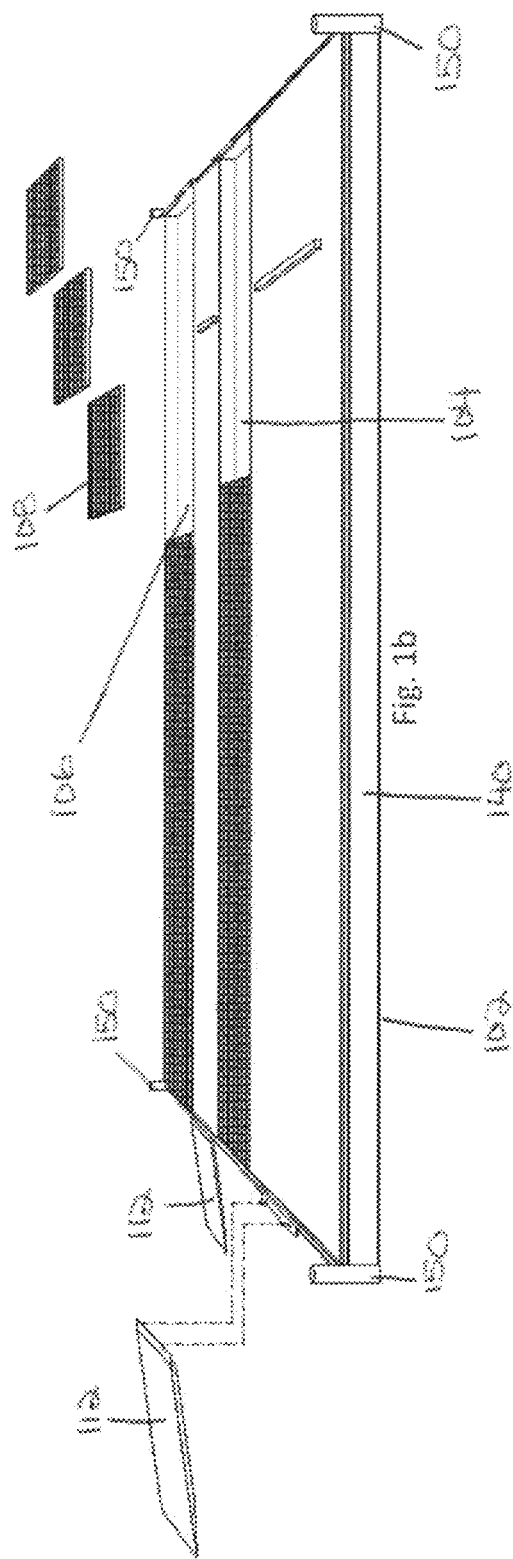

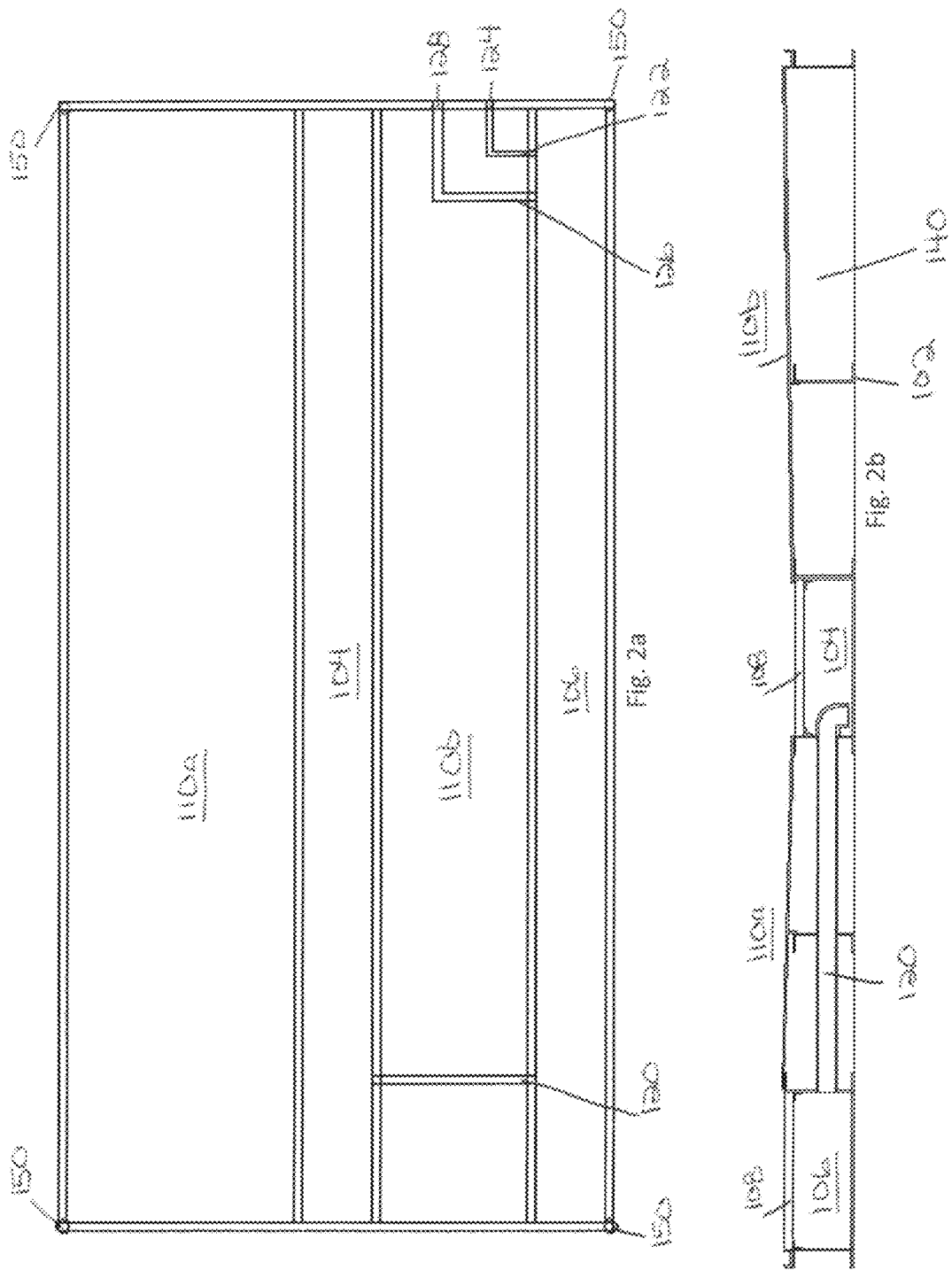

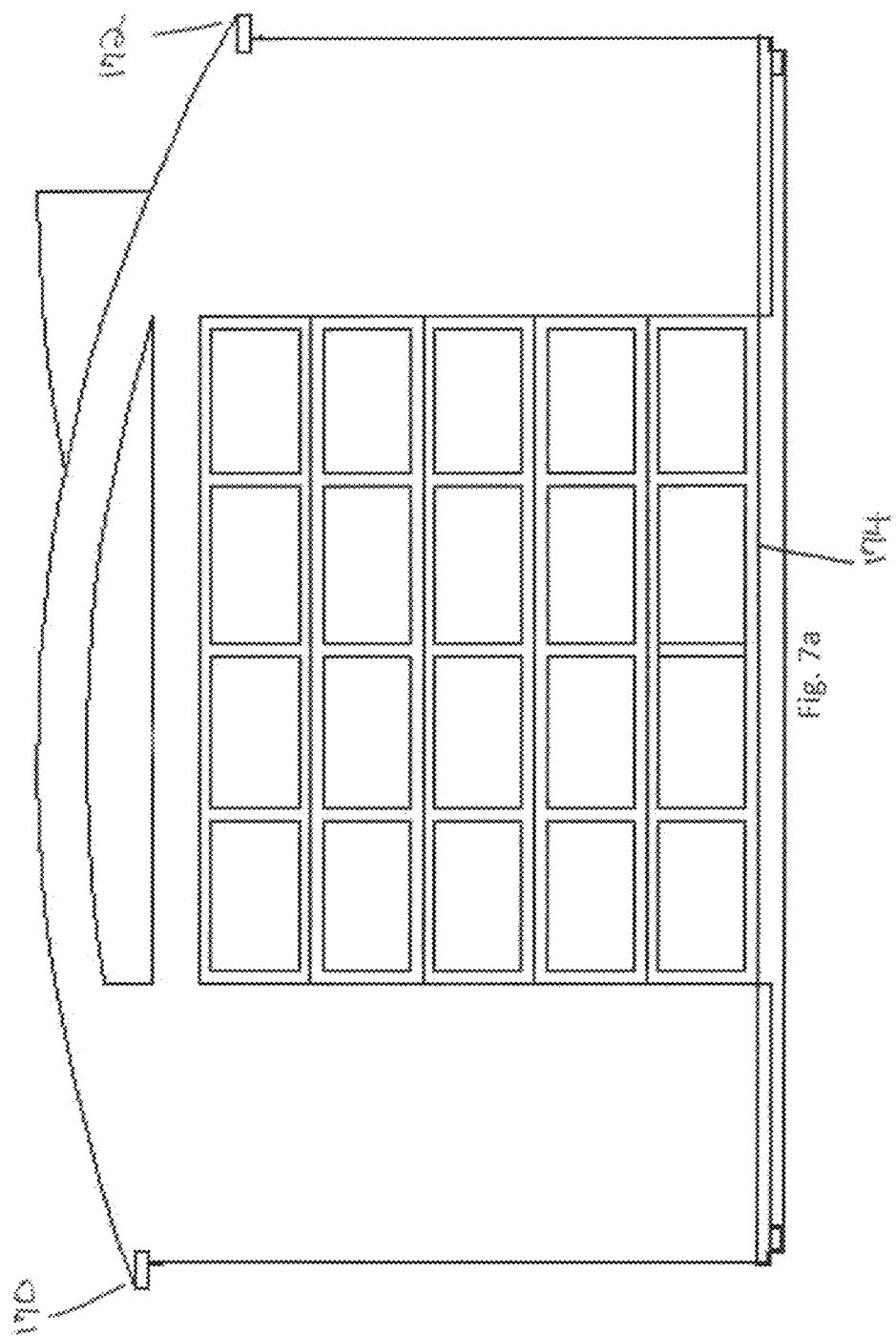

DETAIL BAY WASH WATER RECLAIM SYSTEM

BACKGROUND OF THE INVENTION

The invention relates to wash water reclaim systems, particularly, the reclaiming of the water used to wash vehicles.

BRIEF DESCRIPTION OF THE DRAWINGS

FIG. 1a shows a top view of an embodiment of a wash water reclaim system.

FIG. 1b shows an exploded top view of an embodiment of a wash water reclaim system.

FIG. 2a shows a bottom view of an embodiment of a wash water reclaim system.

FIG. 2b shows a front view of an embodiment of a wash water reclaim system.

FIG. 7a shows a front view of an exemplary enclosure for a wash water reclaim system.

SUMMARY OF THE INVENTION

Figure 3:
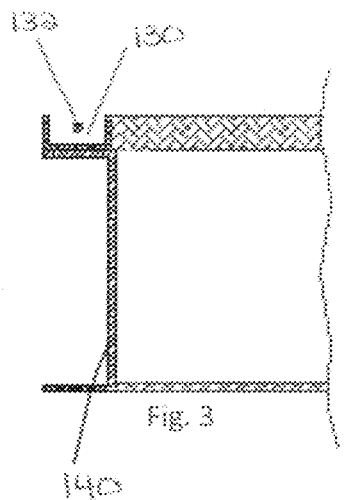
FIG. 3 shows a front sectional view of an embodiment of a wash water reclaim system.

A wash water reclaim system comprising a platform, the platform comprising a left peripheral edge and a right peripheral edge; a separation chamber, the separation chamber approximately located at the center of the platform; a recycled water storage chamber, the recycled water storage chamber located at either the left peripheral edge or the right peripheral edge of the platform; at least one pipe, the at least one pipe connecting the separation chamber to the recycled water storage chamber; at least one loading deck; the at least one loading deck located between the separation chamber and the recycled water storage chamber, the at least one loading deck angled downward toward the separation chamber; and at least one grating, the at least one grating covering at least a portion of the separation chamber and/or at least a portion of the recycled water storage chamber.

In various alternate embodiments, the wash water reclaim system may further comprise at least one vehicle ramp, the at least one vehicle ramp may be removably connected to the platform; the at least one grating may be comprised of fiberglass, galvanized steel and/or aluminum; and the at least one loading deck may be surfaced with a rubberized anti-slip coating.

In other embodiments, the at least one loading deck may be angled steep enough to allow wash water to flow from the at least one loading deck into the separation chamber but flat enough that a person walking on the at least one loading deck would feel the angle. In particular, it may be angled at approximately a 1° angle.

In still other embodiments, the separation chamber and the recycled water storage chamber may be sized to provide enough clean recycled water for potential reuse without an overflow of recycled water. In particular, with a platform that is approximately 24 feet long and approximately 12 feet wide the separation chamber may be approximately 24 feet long, approximately 18 inches wide, and approximately 6 inches deep and the recycled water storage chamber may be approximately 24 feet long, approximately 18 inches wide, and approximately 6 inches deep.

Further, the wash water reclaim system may further comprise at least one overflow pipe and an outlet, the at least one overflow pipe connected to the recycled water storage chamber. It may also further comprise at least one manual drain pipe and an outlet, the at least one manual drain pipe connected to the recycled water storage chamber. Last, it may further comprise a reclaim unit.

In a further embodiment, the wash water reclaim system may be at least partially enclosed by one or more walls and a roof, the roof curved such that one side of the roof is higher than the other side of the roof.

DETAILED DESCRIPTION OF SPECIFIC EMBODIMENTS

In accordance with one embodiment of the invention, a wash water reclaim system separates oils from the reclaimed water used to wash a vehicle, collects debris, and provides clean recycled water for potential re-use in the system. The system may be sized to fit any type of vehicle from, for example, an all-terrain vehicle to, for example, a tractor trailer. Further, the system may require limited on-site assembly, may be modular, and may be customized to fit a particular location or meet certain environmental requirements.

FIGS. 1a and 1b are schematics of an exemplary embodiment of a wash water reclaim system ("hereinafter WWR system"). WWR system 100 comprises platform 102, separation chamber 104, recycled water storage chamber 106, grating 108, loading decks 110a and 110b, and vehicle ramps 112 (which may be removable). Separation chamber 104 is located near, or at, the center of platform 102 and recycled water storage chamber 106 is located proximal to the left peripheral edge of platform 102. In an alternate embodiment, not shown, recycled water storage chamber 106 may be located proximal to the right peripheral edge of platform 102.

Grating 108, which covers separation chamber 104 and recycled water storage chamber 106, may be comprised of fiberglass, galvanized steel, aluminum and/or other similar materials. For ease of assembly and maintenance, grating 108 is easily removable and, as shown in FIG. 2, may be divided into sections.

For safety, loading decks 110a and 110b are surfaced with a rubberized anti-slip coating. Further, loading decks 110a and 110b are slightly angled downward toward separation chamber 104. The angle is steep enough to allow the wash water to flow from loading decks 110a and 110b into separation chamber 104, but flat enough that a person walking on either loading deck would not feel the angle. In a preferred embodiment, loading decks 110a and 110b slope downward toward separation chamber 104 at an approximately 1° angle.

In operation, separation chamber 104 separates oils and water, in particular, it separates the oils in the water that has flowed into chamber 104 from loading decks 110a and 110b. As shown in FIGS. 2a and 2b, as the water flows into chamber 104, and the oils begin to move to the surface of the water, the substantially oil-free water flows from separation chamber 104 to recycled water storage chamber 106 via pipe 120. In turn, chamber 106 stores the substantially oil-free water for potential re-use in WWR system 100.

In WWR system 100, separation chamber 104 and recycle water storage chamber 106 may be sized to provide enough sufficient clean recycled water for potential reuse in WWR system 100 without an overflow of recycled water. For example, if platform 102 is approximately twenty-four (24) feet long and approximately twelve (12) feet wide, then chambers 104 and 106 may be approximately twenty-four (24) feet long, approximately eighteen (18) inches wide, and approximately six (6) inches deep. In an alternate exemplary embodiment, chamber 104 may be smaller in size than chamber 106. In a preferred embodiment, chambers 104 and 106 are comprised of steel.

As discussed above, and as shown in FIGS. 2a and 2b, the substantially oil-free water flows from separation chamber 104 to recycled water storage chamber 106 via pipe 120. Pipe 120 may be located at any position along the length of separation chamber 104. In an alternate exemplary embodiment, the substantially oil-free water may flow from separation chamber 104 to recycled water storage chamber 106 via two or more pipes, with each pipe located at a different position along the length of separation chamber 104.

As shown in FIG. 2a, platform 102 may comprise overflow pipe 122. In operation, when recycled water stored in recycled water storage chamber 106 exceeds a particular depth, the excess recycled water flows from chamber 106 to outlet 124, which may be located at a peripheral edge of platform 102, via pipe 122. In FIG. 2a, outlet 124 is located at the front peripheral edge of platform 102. The excess recycled water may be trapped in a container for potential reuse in WWR system 100. Further, the use of overflow pipe 122 may be controlled with, for example, a spigot.

Also shown in FIG. 2a, platform 102 may comprise manual drain pipe 126. In operation, recycled water stored in recycled water storage chamber 106 flows from chamber 106 to outlet 128, which may be located at a peripheral edge of platform 102, via pipe 126. In FIG. 2a, outlet 128 is located at the front peripheral edge of platform 102. The use of manual drain pipe 126 may be controlled with, for example, a spigot.

In another exemplary embodiment, WWR system 100 may comprise a reclaim unit. The reclaim unit may comprise various filtration systems, including a carbon filtration system for removing dissolved constituents in the wash water, and various water pressure systems. In WWR system 100, the reclaim unit is located at the back edge of platform 102 and is separated from platform 102 via a wall.

In an alternate exemplary embodiment, dial controls on the platform-side of the wall, which are used for mixing solutions, are connected to one or more solution systems located behind the wall. The solution systems may provide various cleaning components for various types of debris found on (or in) a vehicle, or may provide various finishing components for use on (or in) a vehicle.

In operation, the dial controls allow an operator to provide customized cleaning and/or detailing based on the needs of a particular vehicle or vehicle owner. For example, the recycled water may be supplied directly to a water hose, it may be passed through one or more components of the reclaim unit prior to being supplied to a water hose, and/or it may be passed through one of more solution systems prior to being supplied to a water hose.

Figure 4:
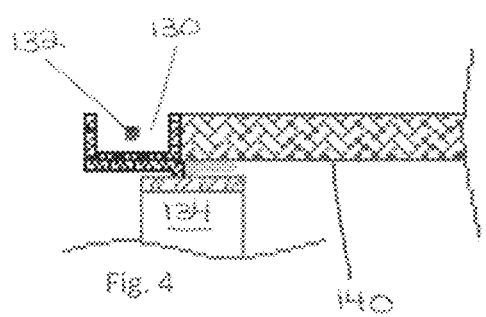
FIG. 4 shows a front sectional view of an embodiment of a wash water reclaim system.
Figure 6:
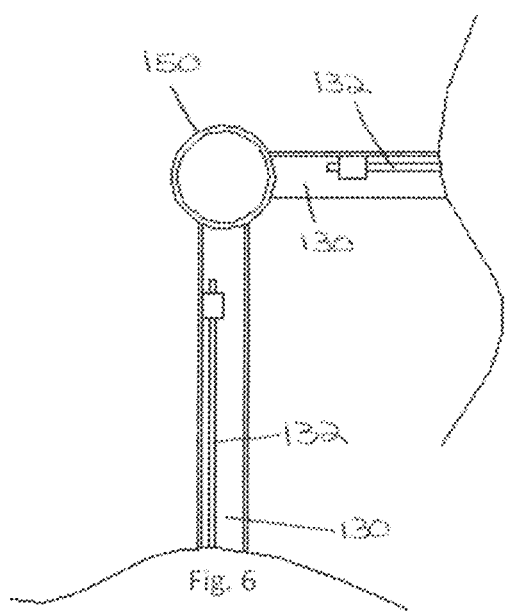
FIG. 6 shows a top sectional view of an embodiment of a wash water reclaim system.

In still another exemplary embodiment, and as shown in FIGS. 3, 4 and 6, WWR system 100 may comprise gutter 130. Gutter 130 may be located proximal to one or more of the peripheral edges of platform 102. Gutter 130 may be the same length as its corresponding peripheral edge, or may be different in length from its corresponding peripheral edge.

Figure 5:
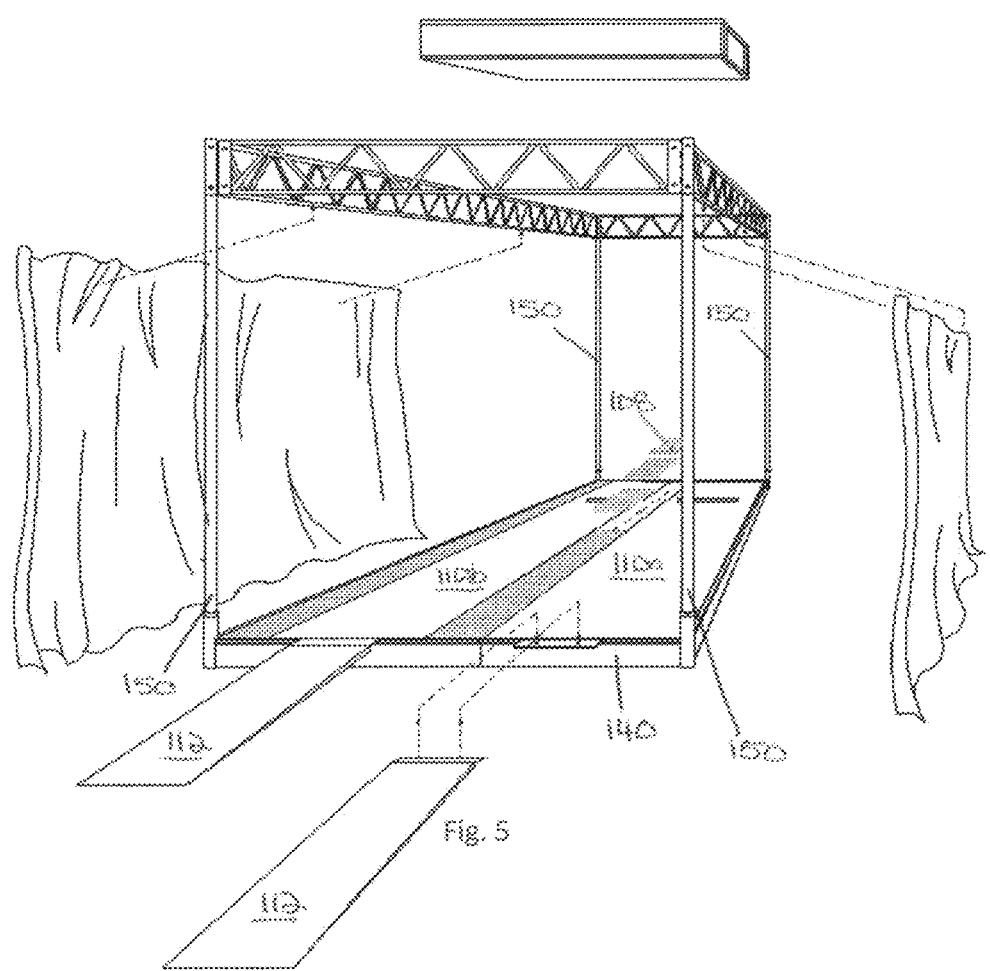
FIG. 5 shows an exploded view of an embodiment of a wash water reclaim system.

In operation, gutter 130 collects the wash water that splashes against, or drips off a wall or a curtain hung from an open or closed roof over platform 102. As shown in FIG. 5, a curtain may be hung along one or more sides of platform 102. When hung, the curtain falls within gutter 130 and, as shown in FIGS. 3, 4 and 6, may be attached to cable 132 (best seen in FIG. 6).

In still another exemplary embodiment, and as shown in FIGS. 1b, 2b and 3, WWR system 100 may comprise support frame 140. Support frame 140 may be a C-channel structural steel support frame. It may be permanently connected (that is, integral) to platform 102, or a portion of platform 102. Also, it may be removably connected to platform 102, or a portion of platform 102. Further, support frame 140 may lie flat on a surface (see FIG. 3) or, as needed, may be elevated from a surface via, for example, legs 134 (see FIG. 4).

In addition to supporting platform 102, support frame 140 comprises column posts 150 (best seen in FIG. 5). Column posts 150 may be permanently connected (that is, integral) to support frame 140, or may be removably connected to support frame 140. Column posts 150 may be used to support an open or closed roof over platform 102.

As discussed above, WWR system 100 may be sized to fit any type of vehicle from, for example, an all-terrain vehicle to, for example, a tractor trailer. Further, WWR system 100 may require limited on-site assembly, may be modular, and may be customized to fit a particular location or meet certain environmental requirements. For example, platform 102 may be comprised of two interlocking portions. The first portion may comprise, in part, loading deck 110b and separation chamber 104, both of which may be permanently connected (that is, integral) to each other or, in an alternate embodiment, removably connected to each other. The second portion may comprise, in part, loading deck 110a and recycled water storage chamber 106, both of which also may be permanently connected (that is, integral) to each other or, in an alternate embodiment, removably connected to each other.

Figure 7B:
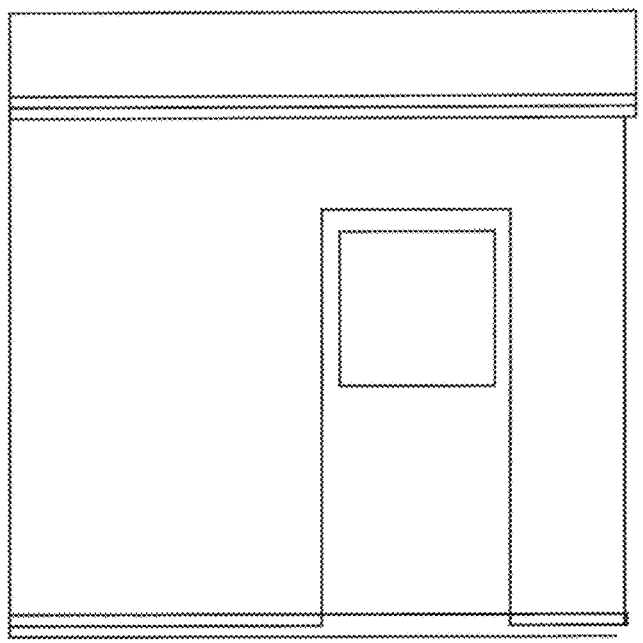
FIG. 7b shows a side view of an exemplary enclosure for a wash water reclaim system.
Figure 7C:
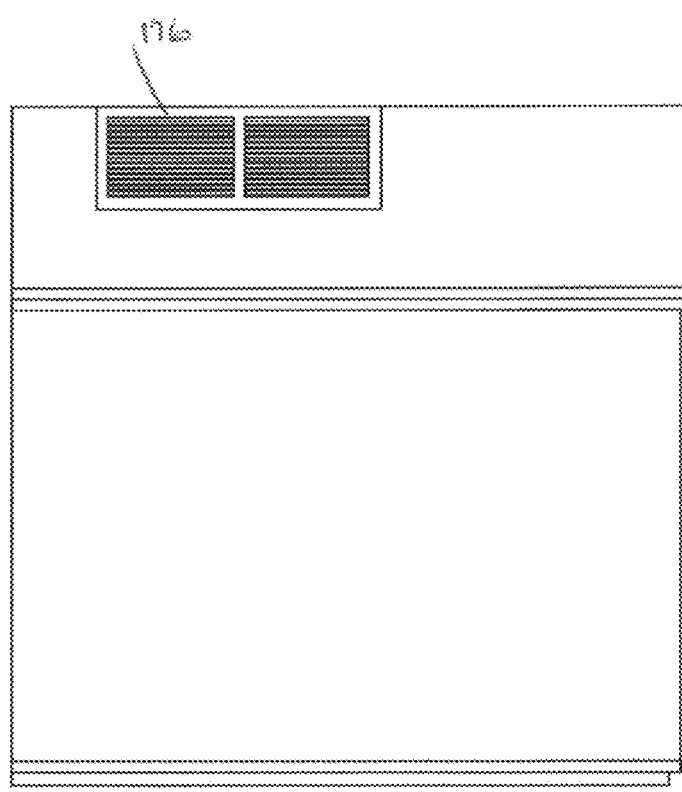
FIG. 7c shows a back view of an exemplary enclosure for a wash water reclaim system.

As shown in FIGS. 7a-7c, WWR system 100 may be partially, or fully, enclosed by one or more walls and/or a roof. As shown in FIG. 7a, the roof may be curved with side 170 of the roof higher than side 172 of the roof. In a preferred embodiment, vehicles enter WWR system 100 via pneumatically-operated sliding garage door 174. As shown in FIG. 7c, exhaust system 176 provides ventilation for WWR system 100.

We claim:

1. A wash water reclaim system to separate wash water from oil upon washing a vehicle comprising
   a. an elevated platform comprising a loading deck for positioning the vehicle to be washed;
   b. a separation chamber located below and near the center of the platform and having an open top and a removable grating positioned over the open top of the separation chamber to form a contiguous surface with the loading deck;
   c. a recycled water storage chamber located below the loading deck and to either side of the separation chamber and having an open top and a removable grating position over the open top of the recycled water storage chamber to form a contiguous platform surface; and
   d. a pipe extending under the loading deck and connecting the separation chamber to the recycled water storage chamber, the pipe being positioned to transport the wash water from the bottom of the separation chamber to the recycled water storage chamber after separation of the wash water from the oil in the separation chamber; wherein the loading deck is angled toward the separation chamber to allow the wash water and oil to flow into the separation chamber during washing of the vehicle.

2. The reclaim system of claim 1 wherein the recycled water storage chamber includes an outlet and the system further comprises a manual drain pipe connected to the outlet at one end, extending to an edge of the platform and terminating in a spigot.

3. The reclaim system of claim 2 wherein the recycled water storage chamber further includes an overflow outlet and the system further comprises an overflow pipe connected to the overflow outlet at one end, extending to an edge of the platform and terminating in a spigot.

4. The reclaim system of claim 2 wherein the platform is at least partially enclosed by one or more walls and a roof, the roof being curved such that one side is higher than the other side.

5. The reclaim system of claim 1 further comprising a vehicle ramp removably connected to the platform for driving the vehicle to be washed onto the loading deck.

6. The reclaim system of claim 5 wherein the gratings are composed of fiberglass, galvanized steel and/or aluminum.

7. The reclaim system of claim 5 wherein the loading deck is surfaced with a rubberized anti-slip coating.

8. The reclaim system of claim 1 wherein the angle is approximately a 1 degree angle.

9. The reclaim system of claim 8 wherein the platform is about 24 feet long and about 12 feet wide and the separation and recycled water storage chambers are each about 24 feet long, about 18 inches wide and about 6 inches deep.

10. The reclaim system of claim 1 wherein the separation and recycle water storage chambers are sized to provide enough clean recycled water for potential reuse without an overflow of recycled water.

* * * * *